US012643305B2

(12) United States Patent

Akutsu

(10) Patent No.: US 12,643,305 B2

(45) Date of Patent: Jun. 2, 2026

(54) DECORATIVE SHEET AND METHOD FOR PRODUCING DECORATIVE SHEET

(71) Applicant: TOPPAN INC., Tokyo (JP)

(72) Inventor: Erika Akutsu, Tokyo (JP)

(73) Assignee: TOPPAN INC., Tokyo (JP)

( * ) Notice: Subject to any disclaimer, the term of this patent is extended or adjusted under 35 U.S.C. 154(b) by 0 days.

(21) Appl. No.: 18/403,365

(22) Filed: Jan. 3, 2024

(65) Prior Publication Data

US 2024/0173937 A1 May 30, 2024

Related U.S. Application Data

(63) Continuation of application No. PCT/JP2022/026859, filed on Jul. 6, 2022.

(30) Foreign Application Priority Data

Jul. 6, 2021 (JP) ................................. 2021-112085

(51) Int. Cl.
B32B 3/30 (2006.01)
B32B 27/08 (2006.01)
(Continued)

(52) U.S. Cl.
CPC ................ B32B 3/30 (2013.01); B32B 27/08 (2013.01); B32B 27/16 (2013.01); B32B 27/308 (2013.01);
(Continued)

(58) Field of Classification Search
CPC .......... B05D 3/065; B05D 3/068; B05D 5/02; B05D 2502/005; C09D 4/00; C09D 5/28;
(Continued)

(56) References Cited

U.S. PATENT DOCUMENTS

| 2007/0231583 A1* | 10/2007 | Iizuka | ..................... B32B 27/10 |
|---|---|---|---|
| | | | 428/411.1 |
| 2008/0070005 A1* | 3/2008 | Kobayashi | .............. B32B 27/08 |
| | | | 428/161 |

(Continued)

FOREIGN PATENT DOCUMENTS

| EP | 4 116 095 A1 | 1/2023 |
|---|---|---|
| JP | 2017-171794 A | 9/2017 |

(Continued)

OTHER PUBLICATIONS

International Searching Authority, "International Search Report," issued in connection with International Patent Application No. PCT/JP2022/026859, dated Aug. 16, 2022.

(Continued)

*Primary Examiner* — Frank J Vineis

(74) *Attorney, Agent, or Firm* — Foley & Lardner LLP

(57) ABSTRACT

A decorative sheet includes a primary film layer and a surface protection layer disposed on one surface of the primary film layer, wherein the surface protection layer includes on a surface thereof a ridged portion protruding in a shape of a ridge and thus has an uneven shape formed on the surface, the uneven shape of the surface protection layer has a ratio RSm/Ra in a range of 10 or more and 300 or less, the surface protection layer contains an ionizing radiation-curable resin as a main material, the ionizing radiation-curable resin contains as a main component an acrylic resin having a repeating structure, the acrylic resin has a dipentaerythritol structure, the repeating structure is one of structures of ethylene oxide, propylene oxide, and ε-caprolactone, and a number of repeating units of the repeating structure is 12 or more.

10 Claims, 3 Drawing Sheets

(51) Int. Cl.

| | |
|---|---|
| *B32B 27/16* | (2006.01) |
| *B32B 27/30* | (2006.01) |
| *B32B 27/32* | (2006.01) |
| *B32B 38/00* | (2006.01) |

(52) U.S. Cl.
CPC ...... *B32B 27/32* (2013.01); *B32B 2038/0076* (2013.01); *B32B 2264/303* (2020.08); *B32B 2264/308* (2020.08); *B32B 2307/406* (2013.01); *B32B 2307/7376* (2023.05); *B32B 2451/00* (2013.01)

(58) Field of Classification Search
CPC ......... B32B 3/30; B32B 27/16; B32B 27/308; B32B 2307/538; B32B 2307/408; B44C 5/0476
See application file for complete search history.

(56) References Cited

U.S. PATENT DOCUMENTS

| | | | | |
|---|---|---|---|---|
| 2011/0143128 | A1* | 6/2011 | Saitou | B29C 45/14811 |
| | | | | 428/335 |
| 2011/0171429 | A1* | 7/2011 | Huang | B44C 1/172 |
| | | | | 428/161 |
| 2014/0255669 | A1* | 9/2014 | Akou | B32B 27/365 |
| | | | | 428/203 |
| 2014/0371384 | A1 | 12/2014 | Fischer et al. | |
| 2015/0099828 | A1 | 4/2015 | Akimoto et al. | |
| 2018/0043669 | A1* | 2/2018 | Iriyama | B32B 27/20 |
| 2018/0043718 | A1* | 2/2018 | Masubuchi | C08G 18/42 |
| 2018/0257328 | A1* | 9/2018 | Shinbara | E04F 15/107 |
| 2019/0184688 | A1* | 6/2019 | Shinbara | C08J 7/046 |
| 2020/0061885 | A1* | 2/2020 | Fujii | B29C 45/14 |
| 2020/0299449 | A1* | 9/2020 | Siband | C08G 18/6258 |
| 2023/0146524 | A1 | 5/2023 | Akutsu | |
| 2023/0256468 | A1 | 8/2023 | Becker et al. | |
| 2023/0323144 | A1* | 10/2023 | Kondo | B44F 1/02 |
| | | | | 428/141 |
| 2023/0364640 | A1* | 11/2023 | Nishine | B44F 1/02 |

FOREIGN PATENT DOCUMENTS

| | | | | | |
|---|---|---|---|---|---|
| JP | 2019-119138 | A | 7/2019 | | |
| JP | 2020-111715 | A | 7/2020 | | |
| JP | 2021-024102 | A | 2/2021 | | |
| KR | 1020200031282 | A | 3/2020 | | |
| WO | WO-2019/034675 | A1 | 2/2019 | | |
| WO | WO-2022054645 | A1* | 3/2022 | | B05D 5/02 |

OTHER PUBLICATIONS

International Searching Authority, "Written Opinion," issued in connection with International Patent Application No. PCT/JP2022/026859, dated Aug. 16, 2022.

European Extended Search Report issued in corresponding European Patent Application No. 22837709.9 dated Sep. 27, 2024 (14 pages).

Office Action issued in corresponding Chinese Patent Application No. 202280044585 dated Apr. 4, 2026.

* cited by examiner

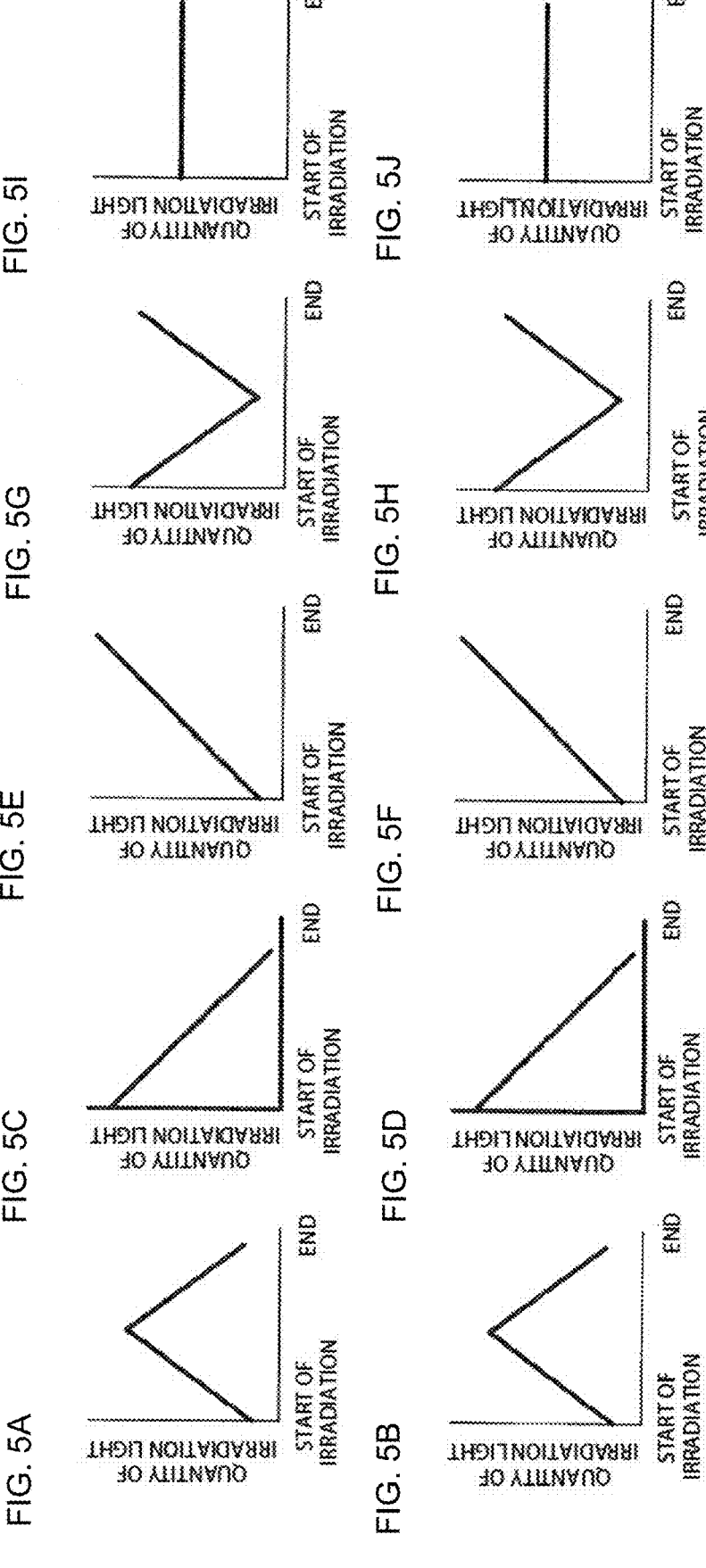

DECORATIVE SHEET AND METHOD FOR PRODUCING DECORATIVE SHEET

CROSS-REFERENCE TO RELATED PATENT APPLICATIONS

This application is a continuation application filed under 35 U.S.C. § 111(a) claiming the benefit under 35 U.S.C. §§ 120 and 365(c) of International Patent Application No. PCT/JP2022/026859, filed on Jul. 6, 2022, which is based upon and claims the benefit of priority to Japanese Patent Application No. 2021-112085, filed on Jul. 6, 2021, the disclosures of which are incorporated herein by reference in their entirety.

TECHNICAL FIELD

The invention relates to a decorative sheet used for, for example, decorating the surface of the interior and exterior of buildings, fittings, furniture, construction materials, floor materials, and the like, and to a method for producing the decorative sheet.

BACKGROUND ART

In order to impart designability and durability to the surface of the buildings, a decorative sheet is typically widely used by being bonded to the surface of wood, a wood board, a metal plate, a fireproof board, a paper substrate, a resin substrate, or the like with an adhesive interposed therebetween, and thus formed into a decorative board.

As to the imparting of designability, selections include from wood or stone patterns formed using various printing methods to a plain surface without a pattern and a design is selected according to the requirement and the use. As to the gloss appearance of the surface similarly regarded as an important item of the designability, selections include from high gloss level like a mirror to low gloss level causing no reflection and the degree of gloss level is selected according to the requirement and the use.

In addition, as described above, the important functions of the decorative sheet include imparting durability as well as the designability. The durability is a result of comprehensively evaluating scratch resistance and stain resistance and further whether these properties are continuously maintained for a long period, and requirement of the durability is different according to the environment and the state in which the decorative sheet is used but a decorative sheet always having high performance is required.

The durability is typically imparted by forming a surface protection layer on the outermost surface of the decorative sheet. In order to adjust the gloss appearance, in particular, to achieve low gloss level, a matting agent (matting additive) is typically added into the surface protection layer.

Further, the decorative sheet is typically subjected to processes such as cutting and bending to form a decorative board or a decorative material and therefore preferred to be processable enough to tolerate these processes.

As such a decorative sheet obtained in consideration of the designability (low gloss level), the scratch resistance, and the stain resistance, there is, for example, a decorative sheet described in Patent Literature 1.

Citation List

Patent Literature

[PTL 1] JP 2019-119138 A

SUMMARY OF THE INVENTION

Technical Problems

Due to expansion of the use of decorative boards including decorative sheets and consumers becoming more quality-conscious, decorative sheets have been recently required to have low gloss level and achieve fingerprint resistance, scratch resistance, and stain resistance. In particular, when used for a floor or the like, decorative sheets are required to have superior scratch resistance.

For satisfying the above requirements, low gloss level is achieved by a method of adding a matting agent at high concentration and thus roughening the surface, but addition of a large amount of the matting agent causes the following inconveniences. (1) Fingerprint stains are not easily removed and fingerprint resistance is decreased. (2) The matting agent becomes detached in a scratch resistance test, resulting in the scratch resistance being decreased. (3) Stains are more An object of the present invention is to provide a decorative sheet having low gloss-level improved or even excellent designability and also having fingerprint resistance and high durability (in particular, scratch resistance and stain resistance) in order to solve the problems, and a method for producing the decorative sheet.

Solution to Problems

By repeated experimentation to optimize an uneven shape of a surface protection layer to achieve low gloss level and to find necessary structural elements of materials used for the surface protection layer, the inventor of the present invention has found that a decorative sheet having low gloss level together with fingerprint resistance and high durability (in particular, scratch resistance and stain resistance) can be provided.

In order to solve the problems, a decorative sheet according to one aspect of the present invention includes, to summarize, a primary film layer and a surface protection layer disposed on one surface of the primary film layer, wherein the surface protection layer includes on a surface thereof a ridged portion protruding in a shape of a ridge and thus has an uneven shape formed on the surface, the uneven shape of the surface protection layer has a ratio RSm/Ra in a range of 10 or more and 300 or less, the surface protection layer contains an ionizing radiation-curable resin as a main material, the ionizing radiation-curable resin contains as a main component an acrylic resin having a repeating structure, the acrylic resin has a dipentaerythritol structure, the repeating structure being selected from among ethylene oxide, propylene oxide, and ε-caprolactone structures, and the number of repetitions of the repeating structure is 12 or more.

Advantageous Effects of the Invention

One aspect of the present invention can provide a decorative sheet having low gloss level and achieving all the fingerprint resistance, the scratch resistance, and the stain resistance.

BRIEF DESCRIPTION OF THE DRAWINGS

FIGS. 5A-5J show schematic graphs illustrating the change of the quantity of irradiation light with time in a step of producing the decorative sheet according to an embodiment of the present invention.

DETAILED DESCRIPTION

Hereinafter, the configuration of a decorative sheet according to an embodiment of the present invention is described with reference to the drawings.

Here, the drawings are schematic, and the relationship between the thickness and the plan dimensions, the ratio in thickness between layers, and the like may be different from actual ones. In addition, the embodiment described below is an example of the configuration for embodying the technical idea of the present invention, and the technical idea of the present invention can undergo various modifications within the technical scope defined by the claims stated in the claims.

Configuration

Figure 1:
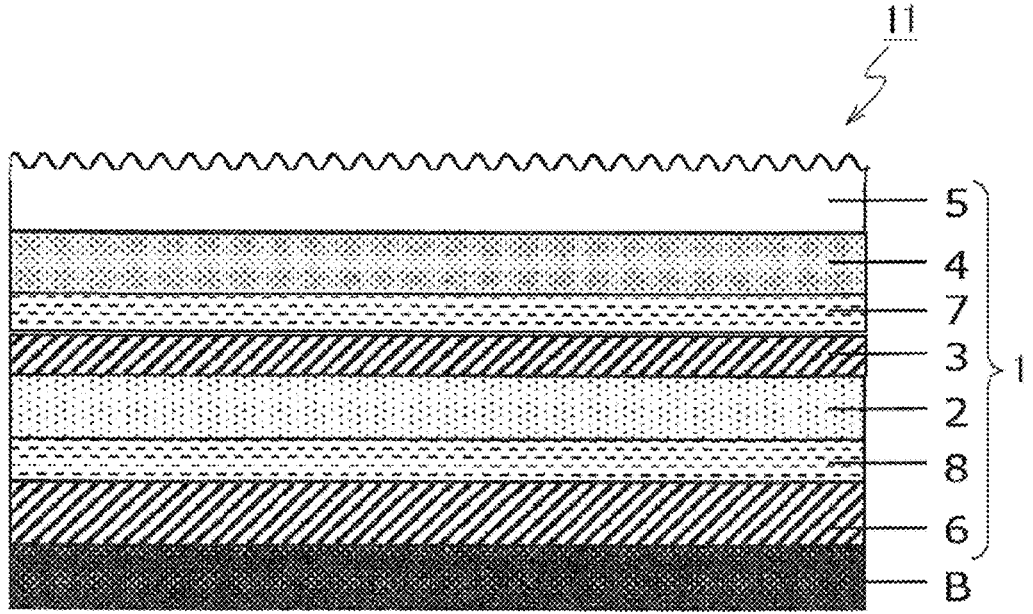
FIG. 1 is a schematic cross-sectional view illustrating a configuration of a decorative sheet according to an embodiment of the present invention.

As illustrated in FIG. 1, a decorative sheet 1 according to the present embodiment is configured to include, on the front-surface side that is one surface of a primary film layer (base material layer) 2, a pattern layer 3, an adhesive layer 7 (a heat-sensitive adhesive layer, an anchor coat layer, or a dry lamination adhesive layer), a transparent resin layer 4, and a surface protection layer 5 stacked in this order. The decorative sheet 1 also includes, on the rear-surface side that is the other surface of the primary film layer 2, a concealing layer 8 and a primer layer 6. The pattern layer 3 and the adhesive layer 7, the transparent resin layer 4, the concealing layer 8, and the primer layer 6 may be omitted.

As illustrated in FIG. 1, the decorative sheet 1 according to the present embodiment is bonded to a substrate B and thereby formed into a decorative material 11. The substrate B is not particularly limited, and is formed of, for example, a wood board, an inorganic board, a metal plate, or a composite plate made from a plurality of materials.

<Primary Film Layer 2>

As the primary film layer 2, any selected from, for example, paper, a synthetic resin or a foam of a synthetic resin, rubber, nonwoven fabric, synthetic paper, or a metal foil may be used. Examples of the paper include tissue paper, titanium paper, and resin-impregnated paper. Examples of the synthetic resin include polyethylene, polypropylene, polybutylene, polystyrene, polycarbonate, polyester, a polyamide, an ethylene-vinyl acetate copolymer, polyvinyl alcohol, and acrylic. Examples of the rubber include ethylene-propylene copolymer rubber, ethylene-propylene-diene copolymer rubber, styrene-butadiene copolymer rubber, styrene-isoprene-styrene block copolymer rubber, a styrene-butadiene-styrene block copolymer rubber, and polyurethane. As the nonwoven fabric, organic or inorganic nonwoven fabric can be used. Examples of a metal of the metal foil include aluminum, iron, gold, and silver.

When an olefin-based resin is used as the primary film layer 2, a primer layer 6 is preferably disposed between the primary film layer 2 and the base material B because the surface of the primary film layer 2 is often inert. Besides, in order to improve adhesion between a primary film layer 2 made from an olefin-based material and the base material B, the primary film layer 2 may be subjected to surface modification treatment such as corona treatment, plasma treatment, ozone treatment, electron beam treatment, ultraviolet light treatment, and dichromate treatment.

As the primer layer 6, the same material as the material of the pattern layer 3 described later can be used. The primer layer 6 is provided on the rear surface of the decorative sheet 1, and therefore in consideration of the decorative sheet 1 being wound in a web shape, an inorganic filler may be added to the primer layer 6 to avoid blocking and increase cohesion to an adhesive. Examples of the inorganic filler include silica, alumina, magnesia, titanium oxide, and barium sulfate.

In consideration of printing workability and cost, the primary film layer 2 preferably has a layer thickness in the range of 20 μm or more and 250 μm or less.

<Pattern Layer 3>

The pattern layer 3 is a layer obtained by printing a pattern on the primary film layer 2 using ink. An ink binder can be used by appropriately selecting one or more of, for example, nitrocellulose, cellulose, vinyl chloride-vinyl acetate copolymer, polyvinyl butyral, polyurethane, acrylic, or polyester, or modified products thereof. The binder may be any of an aqueous, solvent-based, or emulsion type, and may be a one-part type or a two-part type including a curing agent. Further, a method can be used in which a curable ink is used and the ink is cured by irradiation with ultraviolet light, electron beams, or the like. Especially, the most typical method is a method of using urethane-based ink cured by an isocyanate. In addition to the binder, the pattern layer 3 has added thereto a coloring agent such as a pigment and a dye, an extender pigment, a solvent, various additives, or the like contained in general ink. Examples of highly versatile pigments include condensed azo pigments, insoluble azo pigments, quinacridones, isoindolines, anthraquinones, imidazolones, cobalt, phthalocyanine, carbon, titanium oxide, iron oxide, and pearl pigments of mica or the like.

Besides the application of ink, it is also possible to apply a design to the pattern layer 3 by vapor deposition or sputtering of various metals. In particular, the ink preferably has a photostabilizer added thereto. This addition can suppress degradation of the decorative sheet 1 itself caused by photodegradation of ink and prolong the life of the decorative sheet 1.

<Adhesive Layer 7>

The adhesive layer 7 is a layer also called a heat-sensitive adhesive layer, an anchor coat layer, or a dry lamination adhesive layer.

The resin material for the adhesive layer 7 is not particularly limited, and can be appropriately selected from, for example, an acrylic, polyester-based, polyurethane-based, or epoxy-based resin material. Alternatively, as the resin material for the adhesive layer 7, for example, an ethylene-vinyl acetate copolymer resin-based adhesive can also be used. The coating method can be appropriately selected according to, for example, the viscosity of the adhesive. Gravure coating, however, is typically used, and after being applied onto the top of the pattern layer 3 by gravure coating, the adhesive is laminated together with the transparent resin layer 4. The adhesive layer 7 can be omitted when the adhesion strength between the transparent resin layer 4 and the pattern layer 3 is sufficiently obtained.

<Transparent Resin Layer 4>

As the resin material for the transparent resin layer 4, an olefin-based resin is suitably used. Examples of the olefin-based resin include, besides polypropylene, polyethylene, polybutene, and the like, homopolymers of α-olefins or copolymers of two or more α-olefins (e.g., propylene, 1-butene, 1-pentene, 1-hexene, 1-heptene, 1-octene, 1-nonene, 1-decene, 1-undecene, 1-dodecene, tridecane, 1-tetradecene, 1-pentadecene, 1-hexadecene, 1-heptadecene, 1-octadecene, 1-nonadecene, 1-eicosene, 3-methyl-1-butene, 3-methyl-1-pentene, 3-ethyl-1-pentene, 4-methyl-1-pentene, 4-methyl-1-hexene, 4,4-dimethyl-1-pentene, 4-ethyl-1-hexene, 3-ethyl-1-hexene, 9-methyl-1-decene, 11-methyl-1-dodecene, and 12-ethyl-1-tetradecene), and copolymers of ethylene or an α-olefin with another monomer, such as an ethylene-vinyl acetate copolymer, an ethylene-vinyl alcohol copolymer, an ethylene-methyl methacrylate copolymer, an ethylene-ethyl methacrylate copolymer, an ethylene-butyl methacrylate copolymer, an ethylene-methyl acrylate copolymer, an ethylene-ethyl acrylate copolymer, and an ethylene-butyl acrylate copolymer.

In order to improve surface strength of the decorative sheet 1, highly crystalline polypropylene is preferably used as the resin of the transparent resin layer 4. To the transparent resin layer 4, various additives can also be added as necessary, such as a thermal stabilizer, a photostabilizer, an anti-blocking agent, a catalyst scavenger, a coloring agent, a light scattering agent, and a matting agent. As thermal stabilizers, phenol-based, sulfur-based, phosphorus-based, hydrazine-based thermal stabilizers, etc. are typically added, and as photostabilizers, hindered amine-based photostabilizers, etc. may be added, in arbitrary combinations.

<Surface Protection Layer 5>

The surface protection layer 5 includes a core portion 5A and a ridged portion 5B protruding in the shape of a ridge from one surface of the core portion 5A. The surface protection layer 5 thus has an uneven shape formed on the surface thereof.

Here, in the decorative sheet 1 according to the present embodiment, the "in the shape of a ridge" refers to the shape of a narrow and long protrusion that linearly continues in plan view. The ridged portion 5B may be curved or linear in plan view, but is preferably curved from the viewpoint of fingerprint resistance on the surface of the decorative sheet 1. In the present disclosure, the ridged portion 5B is, for example, a part from the lowest portion to the tip of the uneven shape disposed on the surface of the surface protection layer 5, and the core portion 5A refers to a part excluding the ridged portion 5B of the surface protection layer 5.

Figure 2:
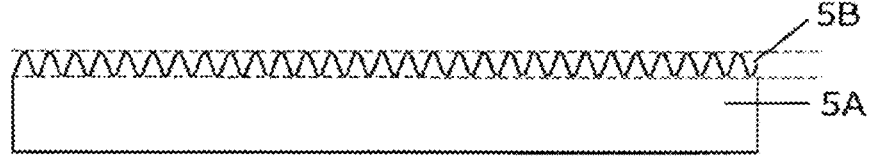
FIG. 2 is a schematic cross-sectional view illustrating one configuration of a surface protection layer in the decorative sheet according to the embodiment of the present invention.
Figure 3:
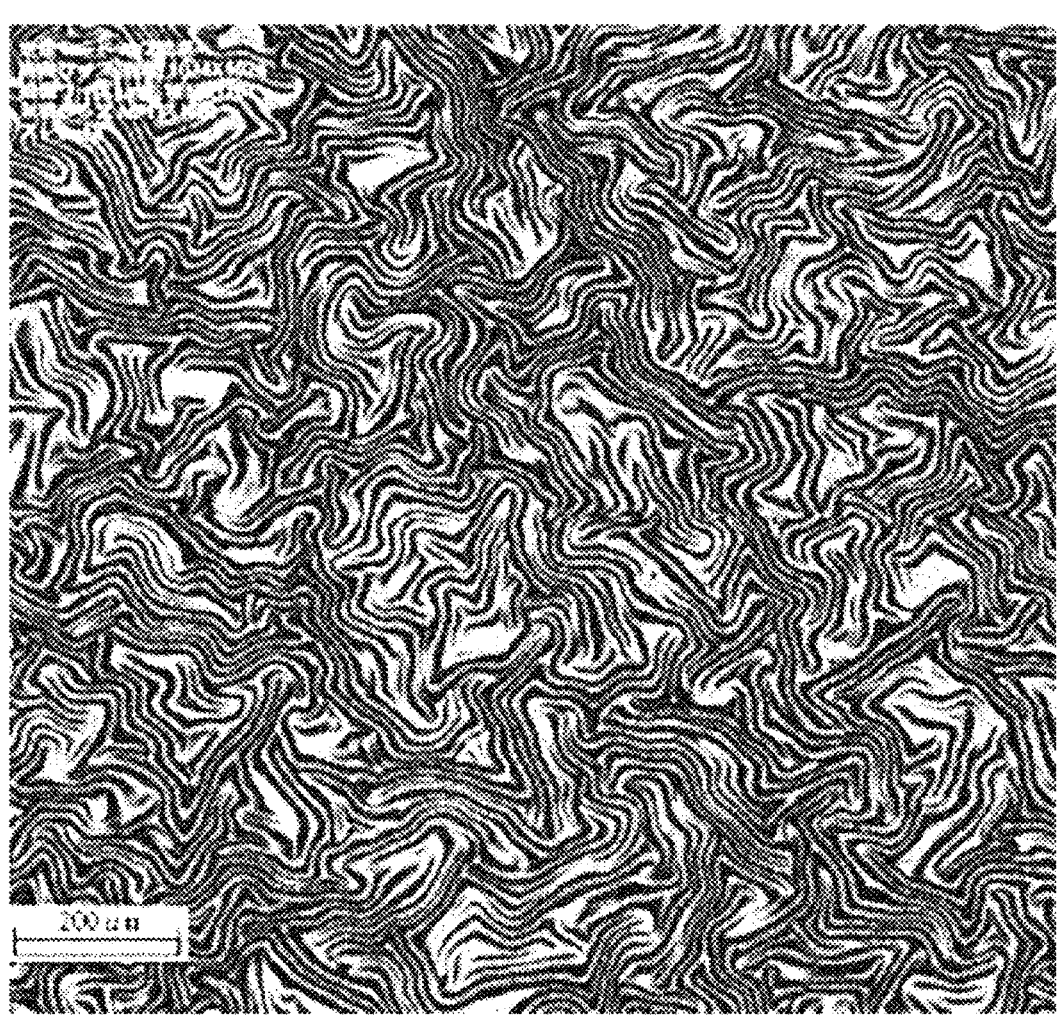
FIG. 3 is a plan photograph illustrating one configuration example of the surface of the surface protection layer in the decorative sheet according to an embodiment of the present invention.

FIG. 2 is a cross-sectional view schematically illustrating a cross-section (a cross-section in the thickness direction of the surface protection layer 5) of the ridged portion 5B in the surface protection layer 5, and FIG. 3 is a plan photograph illustrating a configuration of the surface of the surface protection layer 5. Here, FIG. 3 is a plan photograph obtained with a laser microscope (OLS-4000 manufactured by Olympus Corporation).

As illustrated in the plan photograph of FIG. 3, the ridged portion 5B is in the shape of a narrow and long protrusion that linearly continues in a plan view. As described later, the ridged portion 5B is formed by irradiating the surface of an ionizing radiation-curable resin with light having a certain wavelength and thus shrinking the surface of the ionizing radiation-curable resin.

Such a shape of the ridged portion 5B can be represented by a ratio RSm/Ra between a transverse (planar direction of the surface protection layer 5, and the horizontal direction in FIG. 2) surface roughness index RSm (μm) and a height (depth direction of the ridged portion 5B, i.e., the thickness direction of the surface protection layer 5, and the vertical direction in FIG. 2) surface roughness index Ra (μm), and the RSm/Ra is preferably 10 or more and 300 or less. The RSm/Ra is more preferably 10 or more and 250 or less. When the RSm/Ra is less than 10, the shape of the ridged portion 5B is excessively fine, and therefore stains are not easily wiped off and the stain resistance is deteriorated. When the RSm/Ra is more than 300, the gap between ridge shapes is excessively wide and therefore the ridged portion 5B does not have low gloss level.

Further, the RSm/Ra is further preferably 50 or more and 200 or less. When the RSm/Ra is in this numerical range, the gap between ridge shapes has an appropriate width and therefore the ridged portion 5B improves affinity to water or a detergent (water containing a surfactant or an alcohol). Therefore, decorative sheets having RSm/Ra in this numerical range can have stains easily wiped off therefrom using water or a detergent even if the surface of the decorative sheet is stained.

Further, RSm/Ra is most preferably 80 or more and 150 or less. When RSm/Ra is in this numerical range, typically commercially available washing sponge easily penetrate between the ridged shapes, and even if the surface of the decorative sheet is stained, the stain is easily wiped off using a typically commercially available washing sponge.

Here, Ra and RSm are measurement values obtained through measurement using a line roughness meter (in conformity with JIS B 0601).

The cross-sectional shape of the ridged portion 5B in the thickness direction of the surface protection layer 5 may be a sine wave shape.

Figure 4:
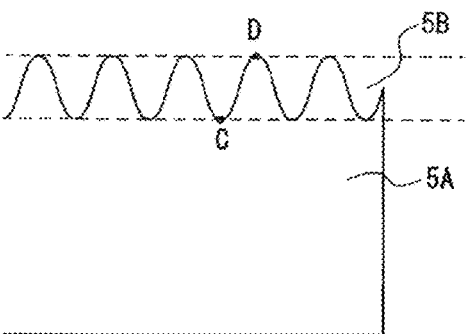
FIG. 4 is a schematic cross-sectional view illustrating a cross-sectional shape of a ridged portion in the embodiment of the present invention.

Here, as illustrated in FIG. 4, "sine wave shape" refers to a shape in which the line from a lowest position C to a highest position (apex) D of the ridged portion 5B can be expressed by a sine wave.

The shape (of a valley) between adjacent ridged portions 5B may be a recessed curved shape. That is, the shape of the lowest position C of the ridged portion 5B may be a recessed curved shape.

Hereinafter, a mechanism of forming the ridged portion 5B is described.

When irradiated with first irradiation light, i.e., light having a wavelength of 200 nm or less, an acrylate can be direct excited. Accordingly, irradiation of an acrylate with light at 200 nm or less enables the acrylate to be crosslinked. Light at 200 nm or less reaches a depth of around several tens to hundreds nm in the acrylate. Therefore, crosslinking is caused only on the surface, and the part below is flowable and therefore a crease-like wave-shaped continuing fine uneven shape is generated.

The surface protection layer 5 thus formed has no interface between the core portion 5A and the ridged portion 5B, and the core portion 5A and the ridged portion 5B are integrally and continuously formed.

Light at 200 nm or less is absorbed by oxygen in the air and greatly attenuated. Therefore, in the treatment of the acrylate, nitrogen gas needs to be introduced to control the reaction atmosphere. The concentration of residual oxygen in the reaction atmosphere is preferably suppressed to 2000 ppm or less. The concentration of residual oxygen in the reaction atmosphere is more preferably 1000 ppm or less.

In order to generate the uneven shape using the first irradiation light, i.e., the light having a wavelength of 200 nm or less, the integrated light intensity of the first irradiation light is preferably set to 0.5 mJ/cm$^2$ or more and 200 mJ/cm$^2$ or less. The integrated light intensity is more preferably 1 mJ/cm$^2$ or more and 100 mJ/cm$^2$ or less. The integrated light intensity is further preferably 3 mJ/cm$^2$ or more and 50 mJ/cm$^2$ or less. The integrated light intensity is most preferably 5 mJ/cm$^2$ or more and 30 mJ/cm$^2$ or less. When the integrated light intensity is less than 0.5 mJ/cm$^2$, the cure shrinkage reaction is weak and the uneven shape is not sufficiently formed, and therefore the gloss level is not decreased. When the integrated light intensity is more than 200 mJ/cm$^2$, the cure shrinkage reaction is excessively strong and the surface state is deteriorated.

The first irradiation light, i.e., light having a wavelength of 200 nm or less, can be extracted from excimer VUV light. Excimer VUV light can be produced from a lamp filled with a noble gas or a noble gas halide compound. When a lamp having a noble gas or a noble gas halide compound gas sealed therein is externally provided with high energy electrons, the lamp generates a large amount of discharge plasma (dielectric barrier discharge). This plasma discharge excites atoms of the discharge gas (noble gas) and instantaneously converts them into an excimer state. When the atoms return from the excimer state to the ground state, light having a wavelength in a range specific to that excimer is emitted.

As the gas used for the excimer lamp, any conventionally used gas may be used as long as the gas causes emission of light at 200 nm or less. As the gas, a noble gas such as Xe, Ar, and Kr, and a mixture of a noble gas with a halogen gas, such as ArBr and ArF can be used. The excimer lamp emits light of different wavelengths (center wavelengths) depending on the gas, and examples of the wavelengths include about 172 nm (Xe), about 126 nm (Ar), about 146 nm (Kr), about 165 nm (ArBr), and about 193 nm (ArF).

In consideration of a difference between the size, wavelength, of the obtained photon energy and the bond energy of the organic matter, a xenon lamp emitting excimer light having a center wavelength of 172 nm is preferably used as a light source. Also, in consideration of facility maintenance costs, material availability, and the like, a xenon lamp is preferably used as a light source.

The first irradiation light, i.e., the light having a wavelength of 200 nm or less, only reaches a depth of around several tens to hundreds nm from the outermost surface in the acrylate, and therefore the inside of the surface protection layer 5 including the ridged portion 5B formed by the irradiation with the light of 200 nm or less is flowable and a curing reaction must be further promoted. In order to cure the surface protection layer 5 after the irradiation with the light at 200 nm or less, second irradiation light may be used that is ionizing radiation or UV light having a wavelength longer than the wavelength of the first irradiation light having a wavelength of 200 nm or less.

In the present embodiment, after the irradiation with the second irradiation light, for example, irradiation may be performed using, as third irradiation light, ionizing radiation different from the second irradiation light or UV light having a wavelength longer than the wavelength of the second irradiation light. The surface protection layer 5 including the ridged portion 5B, however, is preferably formed by irradiation with only the two types of light, i.e., the first irradiation light and the second irradiation light. Here, the third irradiation light may be applied when the strength of the surface protection layer 5 is not sufficient only with the irradiation with the second irradiation light.

In order to cure the entire surface protection layer 5 using irradiation with the second irradiation light, the integrated light intensity of the second irradiation light is preferably set to 10 mJ/cm$^2$ or more and 500 mJ/cm$^2$ or less. The integrated light intensity is more preferably 50 mJ/cm$^2$ or more and 400 mJ/cm$^2$ or less. The integrated light intensity is further preferably 100 mJ/cm$^2$ or more and 300 mJ/cm$^2$ or less. When the integrated light intensity is less than 10 mJ/cm$^2$, the curing reaction is weak and strength cannot be sufficiently imparted to the entire surface protection layer 5, and therefore the scratch resistance tends to be decreased. When the integrated light intensity is more than 200 mJ/cm$^2$, the curing reaction is excessively strong and the surface state tends to be deteriorated.

The integrated light intensity of the second irradiation light is preferably larger than the integrated light intensity of the first irradiation light. The integrated light intensity of the second irradiation light is preferably 1.1 times or more and 50.0 times or less, more preferably 5.0 times or more and 30.0 times or less the integrated light intensity of the first irradiation light. When the integrated light intensity of the second irradiation light is less than 1.1 times the integrated light intensity of the first irradiation light, the curing reaction is weak and sufficient strength cannot sometimes be imparted to the entire surface protection layer 5. When the integrated light intensity of the second irradiation light is more than 50.0 times the integrated light intensity of the first irradiation light, the curing reaction in the entire surface protection layer 5 is excessively strong and the shape of the ridged portion 5B may be deformed.

Hereinafter, the change of the quantity of the first irradiation light with time and the change of the quantity of the second irradiation light with time are described with reference to FIGS. 5A-5J.

FIGS. 5A-5J show graphs schematically illustrating the change of the quantity of the first irradiation light with time and the change of the quantity of the second irradiation light with time.

FIGS. 5A, 5C, 5E, 5G, and 5I are graphs schematically illustrating the change of the quantity of the first irradiation light with time. FIGS. 5B, 5D, 5F, 5H, and 5J are graphs schematically illustrating the change of the quantity of the second irradiation light with time.

As illustrated in FIG. 5A, the quantity of the first irradiation light may be gradually increased with the lapse of irradiation time and thereafter gradually decreased with the lapse of irradiation time. As illustrated in FIG. 5C, the quantity of the first irradiation light may be gradually decreased with the lapse of irradiation time. As illustrated in FIG. 5E, the quantity of the first irradiation light may be gradually increased with the lapse of irradiation time. As illustrated in FIG. 5G, the quantity of the first irradiation light may be gradually decreased with the lapse of irradiation time and thereafter gradually increased with the lapse of irradiation time. As illustrated in FIG. 5I, the quantity of the first irradiation light may be constant from the start to the end of the irradiation.

As illustrated in FIG. 5B, the quantity of the second irradiation light may be gradually increased with the lapse of irradiation time and thereafter gradually decreased with the lapse of irradiation time. As illustrated in FIG. 5D, the quantity of the second irradiation light may be gradually decreased with the lapse of irradiation time. As illustrated in FIG. 5F, the quantity of the second irradiation light may be gradually increased with the lapse of irradiation time. As illustrated in FIG. 5H, the quantity of the second irradiation light may be gradually decreased with the lapse of irradiation time and thereafter gradually increased with the lapse of irradiation time.

As illustrated in FIG. 5J, the quantity of the second irradiation light may be constant from the start to the end of the irradiation.

In the present embodiment, the irradiation forms of the first irradiation light illustrated in FIGS. 5A, 5C, 5E, 5G, and 5I and the irradiation forms of the second irradiation light illustrated in FIGS. 5B, 5D, 5F, 5H, and 5J can be used in appropriate combination. For example, the irradiation form of the first irradiation light illustrated in FIG. 5A and the irradiation form of the second irradiation light illustrated in FIG. 5F may be used in combination. Alternatively, the irradiation form of the first irradiation light illustrated in FIG. 5G and the irradiation form of the second irradiation light illustrated in FIG. 5F may be used in combination. When the value of the RSm/Ra is set to the more preferable range, i.e., 10 or more and 300 or less, the form of the first irradiation light illustrated in FIG. 5C and the irradiation form of the second irradiation light illustrated in FIG. 5F should be used in combination.

As described above, the ridged portion 5B formed by irradiation with light at 200 nm or less has a finer structure than the structure of an uneven shape formed on the surface of the surface protection layer 5 by a machine process such as embossing. The formation of such a fine uneven shape on the surface of the surface protection layer 5 enables the decorative sheet 1 have improved fingerprint resistance while maintaining matting of the surface thereof.

The surface protection layer 5 preferably has a layer thickness in a range of 2 μm or more and 20 μm or less. The surface protection layer 5 more preferably has a layer thickness in a range of 3 μm or more and 20 μm or less The surface protection layer 5 further preferably has a layer thickness in a range of 5 μm or more and 15 μm or less The surface protection layer 5 most preferably has a layer thickness in a range of 5 μm or more and 12 μm or less The surface protection layer 5 having a layer thickness of less than 2 μm does not allow deep shaping by vacuum ultraviolet light and cannot achieve low gloss level. The surface protection layer 5 having a layer thickness of more than 20 μm decreases processability and becomes whitened when bent.

The layer thickness of the surface protection layer 5 is set such that the ratio between the layer thickness of the ridged portion 5B and the layer thickness of the core portion 5A (layer thickness of ridged portion 5B/layer thickness of core portion 5A) is preferably 0.01 or more and 2.0 or less, more preferably 0.1 or more and 1.0 or less.

Here, the pattern layer 3 and the surface protection layer 5 can be formed by various printing methods such as a gravure printing method, an offset printing method, a screen printing method, an electrostatic printing method, and an ink-jet printing method. Alternatively, because the surface protection layer 5 covers the entire surface on the front-surface side of the primary film layer 2, the surface protection layer 5 can be formed by various coating methods such as roll coating, knife coating, micro gravure coating, and die coating. From these printing and coating methods, a method may be selected separately for the layer to be formed, or the same method may be selected for a collective process of the layers to be formed.

From the viewpoint of designability, the pattern layer 3 and the surface protection layer 5 may be synchronized. In the synchronization, the surface protection layer 5 needs to be collectively formed after the formation of the pattern layer 3 and therefore a gravure printing method is preferably used. In addition, a gravure printing method enables comparatively high-speed printing and therefore is advantageous and preferable also in terms of costs. Here, synchronization means that 50% or more, preferably 70% or more, most preferably 90% or more of the part in which the surface protection layer 5 is formed overlap the pattern part of the pattern layer 3 in a plan view.

In order to adjust the layer thickness of the surface protection layer 5, the coating amount may be adjusted in the printing and coating methods described above. The coating amount can be calculated by producing a product including the surface protection layer formed on the base material (primary film layer) by various printing and coating methods, and a product without the surface protection layer, and then calculating the difference in mass therebetween.

The surface protection layer 5 contains an ionizing radiation-curable resin as a main material. Here, the main material refers to a material contained in an amount of 60 parts by mass or more, more preferably 70 parts by mass or more, most preferably 80 parts by mass or more, relative to 100 parts by mass of the surface protection layer. As the ionizing radiation-curable resin forming the surface protection layer 5, known resins such as various monomers and commercially available oligomers can be used, and for example, a (meth)acrylic resin, a silicone-based resin, a polyester-based resin, a urethane-based resin, an amide-based resin, and an epoxy-based resin may be used. The ionizing radiation-curable resin may be either an aqueous resin or a non-aqueous (organic solvent-based) resin.

The ionizing radiation-curable resin forming the surface protection layer 5 contains as a main component an acrylate resin having a repeating structure and a dipentaerythritol structure. In other words, the ionizing radiation-curable resin forming the surface protection layer 5 contains as a main component an acrylate resin (acrylic resin) having a repeating structure, and the acrylate resin has a dipentaerythritol structure. Due to the dipentaerythritol structure contained in the acrylate resin, the acrylate resin increases the degree of crosslinking and easily obtains a three-dimensional structure. As a result of the three-dimensional structure, the surface protection layer 5 can improve strength.

Usable as the acrylate resin having a dipentaerythritol structure are, for example, dipentaerythritol pentaacrylate and dipentaerythritol hexaacrylate. Here, the main component refers to a component contained in an amount of 60 parts by mass or more, more preferably 70 parts by mass or more, most preferably 80 parts by mass or more, relative to 100 parts by mass of the constituent resin component.

The acrylic resin having a dipentaerythritol structure is preferably penta-functional or hexa-functional. More specifically, the number of acryloyl groups contained in the dipentaerythritol structure is preferably 5 or 6. A resin that is tetra- or lower functional decreases the degree of crosslinking and the scratch resistance, and therefore is not preferred. That is, when the number of acryloyl groups contained in the dipentaerythritol structure is 4 or less, the acrylate resin (acrylic resin) decreases the degree of crosslinking and the scratch resistance, and therefore is not preferred.

When a gravure printing method is used as a coating method, the suitable viscosity range of the ionizing radiation-curable resin is 10 to 500 mPa·s and the optimal viscosity range is 50 to 300 mPa·s. In order to adjust the viscosity, an organic solvent or a bi- to tetra-functional acrylate resin having a low viscosity can be added. From the viewpoint of environmental burden, however, an ionizing radiation-curable resin containing no organic solvent is preferred. A large addition amount of a bi- to tetra-functional acrylate resin decreases the scratch resistance and therefore is not preferred. Therefore, when a bi- to tetra-functional acrylate resin is used by adding it to the acrylate resin having a dipentaerythritol structure, the content of the bi- to tetra-functional acrylate resin is preferably in a range of 10 mass % or more and 30 mass % or less, more preferably in a range of 15 mass % or more and 25 mass % or less, relative to the content (mass) of the acrylate resin having a dipentaeryth-ritol structure. The bi- to tetra-functional acrylate resin refers to an acrylate resin having 2 to 4 acryloyl groups.

The repeating structure is one of an ethylene oxide (EO) structure, a propylene oxide (PO) structure, and an ε-capro-lactone (CL) structure. The repeating structure is more preferably an ethylene oxide structure or a propylene oxide structure. The ethylene oxide structure, the propylene oxide structure, and the ε-caprolactone structure are preferable because the molecules thereof are freely rotatable and highly flexible, and therefore easily undergo folding under light at 200 nm or less, and a fine uneven shape is easily formed. Further, the number of repetitions of the repeating structure is 12 or more. The number of repetitions is more preferably 12 or more and 50 or less, most preferably 16 or more and 50 or less. When the number of repetitions is 11 or less, the ionizing radiation-curable resin forming the surface protec-tion layer 5 does not sufficiently shrunk during irradiation with vacuum ultraviolet light (VUV light) and the surface protection layer 5 does not have low gloss level. When the number of repetitions is more than 50, crosslinking density is lowered and scratch resistance of the surface protection layer 5 is deteriorated.

The number of repetitions of the repeating structure can be analyzed using MALDI-TOF-MS. The ionizing radia-tion-curable resin may have a molecular weight distribution. When the ionizing radiation-curable resin has a molecular weight distribution, the number of repetitions refers to the number of repetitions of the structure corresponding to the molecular weight with the strongest peak in a MALDI-TOF-MS mass spectrum.

The surface protection layer 5 may contain particles. The addition of an optimal amount of particles having an optimal particle size enables formation of a uniform surface. As the particles, for example, an organic material such as PE wax, PP wax, and resin beads, or an inorganic material such as silica, glass, alumina, titania, zirconia, calcium carbonate, and barium sulfate may be used.

The particles preferably have an average particle size (D50) of 10 μm or less. The particles have an average particle size of more, preferably 1 μm or more and 8 μm or less, further preferably 2 μm or more and 6 μm or less, and most preferably 3 μm or more and 5 μm or less. The particles having an average particle size of more than 10 μm cause a decrease of the scratch resistance due to detachment of particles and therefore are not preferred. Particles having an average particle size of less than 1 μm have only a small effect of making the surface uniform and therefore are not preferred.

The addition amount of the particle is preferably 0.5 parts by mass or more and 10 parts by mass or less, relative to 100 parts by mass of the ionizing radiation-curable resin. The addition amount of the particles is more preferably 2 parts by mass or more and 8 parts by mass or less, further preferably 2 parts by mass or more and 6 parts by mass or less, most preferably 4 parts by mass or more and 5 parts by mass or less. The surface protection layer 5 containing the particles added thereto in the addition amount described above enables formation of a uniform-surface state and therefore is preferable.

Here, the "particle size (average particle size)" may be defined as a value (average value) obtained by particle size distribution measurement of the particles used or as a value obtained by actually measuring and averaging the particle sizes of a plurality of particles observed on a cross-section of the decorative material obtained. The two values of the particle size obtained are based on different measuring methods, but are substantially the same. For example, the average particle size of the particles added to the surface protection layer 5 may be a median diameter (D50) mea-sured by a laser diffraction/scattering particle size distribu-tion analyzer.

When the entire surface protection layer 5 is cured by UV light, it is necessary to add a photoinitiator to the surface protection layer 5. The photoinitiator is not particularly limited, and examples thereof include benzophenone-based, acetophenone-based, benzoin ether-based, and thioxan-thone-based photoinitiators.

In order to impart a required functionality to the surface protection layer 5, any functional additive, such as an antimicrobial agent and an antifungal agent, can be added. It is also possible to add an ultraviolet absorbent or a photo-stabilizer to the surface protection layer 5 as necessary. As the ultraviolet absorbent any combination between, for example, benzotriazole-based, benzoate-based, benzophe-none-based, and triazine-based ultraviolet absorbents may be added, and as the photostabilizer any combination between, for example, hindered amine-based photostabiliz-ers may be added.

This decorative sheet 1 has a gloss level of 5.0 or less and is a decorative sheet having a very low gloss level regardless of containing no matting agent (matting additive). When a conventional decorative sheet including a surface protection layer has a gloss level of 8 or less, the content ratio of a matting agent in the surface protection layer is high and the surface protection layer becomes turbid. Therefore, the colors and the pattern of the colored pattern layer may possibly not be expressed clearly or the designability of the decorative sheet may possibly be decreased. When a deco-rative sheet having a gloss level near 0 is attempted to be obtained, the content ratio of a matting agent in a surface protection layer is further increased. Therefore, it is difficult to form a surface protection layer having a smooth surface without generating streaks, unevenness, and the like in forming the surface protection layer.

The decorative sheet 1 can provide a decorative sheet having a low gloss level, i.e., a gloss level of 5.0 or less, while maintaining the same performance as the performance of a decorative sheet having a gloss level of 20 or more. Here, the "gloss level" is a measurement value obtained by measurement using a gloss level meter in conformity with JIS Z 8741, with an incident angle of 60 degrees.

<Concealing Layer 8>

When concealment of the base material B is desired to be imparted to the decorative sheet 1, such concealment can be achieved by using a colored sheet as the primary film layer 2 or separately disposing a concealing layer 8 that is opaque. The concealing layer 8 can be basically formed of the same material as the material of the pattern layer 3, but since the concealing layer 8 is provided for the purpose of conceal-ment, a pigment preferably used is, for example, an opaque pigment, titanium oxide, or iron oxide. In order to increase the concealment, it is also possible to add a metal such as gold, silver, copper, and aluminum. Typically, aluminum flakes are often added.

Production Method

A production example of a decorative sheet 1 is described.

A resin film is used as a primary film layer 2 and a surface protection layer 5 is formed on the top of the primary film layer 2 by printing. The surface of an applied ionizing radiation-curable resin in the surface protection layer 5 is irradiated with light (first irradiation light) having a wavelength of 200 nm or less and is shrunk. Subsequently, in order to cure the shrunk ionizing radiation-curable resin, irradiation is performed with ionizing radiation or UV light having a wavelength longer than the wavelength of the first irradiation light which is the light having a wavelength of 200 nm or less. Thus, a decorative sheet 1 is formed that includes the surface protection layer 5 including a core portion 5A and a ridged portion 5B protruding in the shape of a ridge from one surface (top) of the core portion 5A.

The present embodiment is not limited to the embodiment described above. For example, in order to cure the shrunk ionizing radiation-curable resin, irradiation may be performed only once with ionizing radiation or UV light having a wavelength longer than the wavelength of the first irradiation light which is light having a wavelength of 200 nm or less. In the irradiation, the integrated light intensity of the first irradiation light, i.e., the light having a wavelength of 200 nm or less, may be set to 0.5 mJ/cm$^2$ or more and 200 mJ/cm$^2$ or less.

Effects and Others

The decorative sheet 1 according to the present embodiment includes the surface protection layer 5 having an uneven shape formed on the surface thereof. With this configuration, the gloss (gloss level) of the surface protection layer can be adjusted even when the surface protection layer contains no matting agent (matting additive). A matting agent decreases oil repellency of a layer formed of a resin material and therefore fingerprints are easily attached to the layer. The surface protection layer 5 of the present embodiment contains no matting agent and therefore does not absorb oil and relatively improves oil repellency. Therefore, in various situations during on-site construction, furniture assembly, and daily life of people, fingerprints are less likely to adhere to the decorative sheet 1 including the surface protection layer 5.

Further, the configuration of the surface protection layer 5 having an uneven shape formed on the surface thereof improves oil repellency of the surface protection layer 5 and enables suppression of adsorption of oil stains or contaminants to the surface of the decorative sheet 1.

Furthermore, the configuration of the surface protection layer 5 containing no matting agent does not allow detachment of particles of a matting agent when the surface of the decorative sheet 1 is scratched, and the configuration enables a gloss change or scratches to be less likely to occur on the surface of the decorative sheet 1.

In the present embodiment, the surface protection layer 5 is formed of one layer, but is not limited to this configuration. For example, the surface protection layer 5 may have a multilayer configuration. That is, the surface protection layer 5 may include a plurality of laminated layers of identical ionizing radiation-curable resin or a plurality of laminated layers of different ionizing radiation-curable resins, with the uneven shape formed on the surface of the surface protection layer 5. When the surface protection layer 5 includes a plurality of laminated layers of different ionizing radiation-curable resins, for example, the outermost layer of the surface protection layer 5 contains an ionizing radiation-curable resin as a main material, the ionizing radiation-curable resin contains as a main component an acrylic resin having a repeating structure and a dipentaerythritol structure, the repeating structure has one of ethylene oxide, propylene oxide, and &-caprolactone structures, the number of repetitions of the repeating structure is 12 or more, and a layer positioned on the primary-film-layer-2 side of the surface protection layer 5 (that is, a layer positioned below the outermost layer of the surface protection layer 5) is not particularly limited.

EXAMPLES

Hereinafter, examples based on the present invention are described.

Example 1

With use of a 55-μm-thick olefin film (manufactured by RIKEN TECHNOS CORP.) as a primary film layer, one surface of the primary film layer was subjected to a corona treatment and the following surface protection layer coating solution was applied to the one surface. The layer thickness of the surface protection layer coating solution was set to 5 μm. Thereafter, the surface of the surface protection layer coating solution was irradiated with light having a wavelength of 172 nm using a Xe excimer lamp such that the integrated light intensity of the light was 100 mJ/cm$^2$, and the surface was thus shrunk. Subsequently, the surface protection layer coating solution was cured by irradiation with 100 kGy of ionizing radiation to form a surface protection layer 5, and a decorative sheet of Example 1 having a total thickness of 60 μm was obtained.

(Surface Protection Layer Coating Solution)

The surface protection layer coating solution was formed by blending the following particles in the following ionizing radiation-curable resin.

Ionizing Radiation-Curable Resin

Type: ethoxylated dipentaerythritol hexaacrylate (30 mol EO added)

Content: 100 parts by mass

Particles

Product name: SYLYSIA 250N (manufactured by Fuji Silysia Chemical Ltd.)

Particle size: 5 μm

Blended: 0.5 parts by mass

Example 2

A decorative sheet of Example 2 was obtained in the same manner as in Example 1 except for replacing the ionizing radiation-curable resin of Example 1 with the following.

Ionizing Radiation-Curable Resin

Type: ethoxylated dipentaerythritol pentaacrylate (30 mol EO added)

Example 3

A decorative sheet of Example 3 was obtained in the same manner as in Example 1 except for replacing the ionizing radiation-curable resin of Example 1 with the following.

Ionizing Radiation-Curable Resin

Type: ethoxylated dipentaerythritol hexaacrylate (50 mol EO added)

Example 4

A decorative sheet of Example 4 was obtained in the same manner as in Example 1 except for replacing the ionizing radiation-curable resin of Example 1 with the following.

Ionizing radiation-curable resin

Type: ethoxylated dipentaerythritol hexaacrylate (12 mol EO added)

Example 5

A decorative sheet of Example 5 was obtained in the same manner as in Example 1 except for replacing the ionizing radiation-curable resin of Example 1 with the following.

Ionizing Radiation-Curable Resin

Type: propoxylated dipentaerythritol hexaacrylate (30 mol PO added)

Example 6

A decorative sheet of Example 6 was obtained in the same manner as in Example 1 except for replacing the ionizing radiation-curable resin of Example 1 with the following.

Ionizing Radiation-Curable Resin

Type: caprolactone-modified dipentaerythritol hexaacrylate (30 mol CL added)

Example 7

A decorative sheet of Example 7 having a total thickness of 56 μm was obtained in the same manner as in Example 1 except for changing the layer thickness of the surface protection layer coating solution of Example 1 to 1 μm.

Example 8

A decorative sheet of Example 8 having a total thickness of 57 μm was obtained in the same manner as in Example 1 except for changing the layer thickness of the surface protection layer coating solution of Example 1 to 2 μm.

Example 9

A decorative sheet of Example 9 having a total thickness of 75 μm was obtained in the same manner as in Example 1 except for changing the layer thickness of the surface protection layer coating solution of Example 1 to 20 μm.

Example 10

A decorative sheet of Example 10 having a total thickness of 80 μm was obtained in the same manner as in Example 1 except for changing the layer thickness of the surface protection layer coating solution of Example 1 to 25 μm.

Example 11

A decorative sheet of Example 11 was obtained in the same manner as in Example 10 except for not blending the particles of Example 10.

Example 12

A decorative sheet of Example 12 was obtained in the same manner as in Example 1 except for not blending the particles of Example 1.

Example 13

A decorative sheet of Example 13 was obtained in the same manner as in Example 1 except for replacing the particles of Example 1 with the following.

Particles

Product name: SYLYSIA 450 (manufactured by Fuji Silysia Chemical Ltd.)

Particle size: 8.0 μm

Blended: 0.5 parts by mass

Example 14

A decorative sheet of Example 14 was obtained in the same manner as in Example 1 except for replacing the particles of Example 1 with the following.

Particles

Product name: SYLYSIA 780 (manufactured by Fuji Silysia Chemical Ltd.)

Particle size: 11.3 μm

Blended: 0.5 parts by mass

Example 15

A decorative sheet of Example 15 was obtained in the same manner as in Example 1 except for changing the blending amount of the particles of Example 1 to 10 parts by mass.

Example 16

A decorative sheet of Example 16 was obtained in the same manner as in Example 1 except for changing the blending amount of the particles of Example 1 to 11 parts by mass.

Example 17

A decorative sheet of Example 17 having a total thickness of 56 μm was obtained in the same manner as in Example 1 except for changing the layer thickness of the surface protection layer coating solution of Example 1 to 1 μm and blending no particles.

Example 18

A decorative sheet of Example 18 having a total thickness of 80 μm was obtained in the same manner as in Example 3 except for changing the layer thickness of the surface protection layer coating solution of Example 3 to 25 μm.

Comparative Example 1

A decorative sheet of Comparative Example 1 was obtained in the same manner as in Example 1 except for not performing the irradiation using an excimer lamp of Example 1 and changing the blending amount of the particles to 15 parts by mass.

Comparative Example 2

A decorative sheet of Comparative Example 2 was obtained in the same manner as in Example 1 except for replacing the ionizing radiation-curable resin of Example 1 with the following.

Ionizing Radiation-Curable Resin

Type: ethoxylated pentaerythritol tetraacrylate (35 mol EO added)

<Comparative Example 3

A decorative sheet of Comparative Example 3 was obtained in the same manner as in Example 1 except for replacing the ionizing radiation-curable resin of Example 1 with the following.

Ionizing Radiation-Curable Resin

Type: Dipentaerythritol hexaacrylate (Evaluations)

The decorative sheets of Examples 1 to 18 and Comparative Examples 1 to 3 obtained by the methods described above were evaluated.

When evaluated as "good" or "fair" in the present examples, the decorative sheet had no problem in actual use and was evaluated as approved.

<Surface State>

As the surface state, the uniformity of the surface was evaluated by visual inspection.

The evaluation criteria were as follows.

Good: uniform surface

Fair: partially nonuniform

Poor: entire surface nonuniform

<Gloss Level>

As the gloss level, a 60-degree gloss level was measured using Rhopoint IQ (manufactured by KONICA MINOLTA, INC.). Tables 1 and 2 show the 60-degree gloss level as "60° gloss value".

When having a gloss level of 15 or less, the surface is sufficiently visually recognized as low gloss. Therefore, a surface having a gloss level of "15 or less" was evaluated as approved in the present examples.

<Fingerprint Resistance: Evaluation of Wipe-Off Properties>

As an evaluation of fingerprint resistance, an evaluation of fingerprint wipe-off properties was conducted.

The 60-degree gloss level of the surface of the decorative sheets was measured and defined as an [initial gloss level]. Subsequently, a fingerprint-resistance evaluation solution was adhered to the surface protection layer and then the fingerprint-resistance evaluation solution adhered to the surface of the decorative sheet was wiped off. Thereafter, the 60-degree gloss level of the part from which the fingerprint-resistance evaluation solution had been wiped off was measured and defined as a [post-wipe-off gloss level]. Here, as the fingerprint-resistance evaluation solution, a higher fatty acid was used.

The fingerprint wipe-off rate was calculated as follows.

Fingerprint wipe-off rate (%)=(post-wipe-off gloss
level/initial gloss level)×100

The evaluation criteria were as follows.

Good: 70% or more and less than 250%

Fair: 50% or more and less than 70%, or 250% or more and less than 300%.

Poor: less than 50% or 300% or more.

<Stain Resistance>

As the evaluation of stain resistance, the stain resistance against ink was evaluated by a stain A test stipulated in Japanese Agricultural Standards (JAS), in which 10-mm wide lines were drawn respectively in blue ink, quick-drying black ink, and red crayon and left for 4 hours, and then wiped off with cloth impregnated with ethanol.

The evaluation criteria were as follows.

Good: all the color lines were easily wiped off.

Fair: part of the color lines were wiped off but stains were partially left.

Poor: the color lines were not wiped off.

<Scratch Resistance Test: Stainless Steel Wool Rubbing Test>

The decorative sheets obtained were each bonded to a wood substrate B using a urethane-based adhesive, and then subjected to a stainless steel wool rubbing test as a scratch resistance evaluation. The decorative sheet was rubbed for 20 strokes with steel wool having a load of 500 g placed thereon and checked by visual inspection for scratches and change of gloss level generated on the surface of the decorative sheet.

The evaluation criteria were as follows.

Good: no scratch or change of gloss level generated on the surface

Fair: slight scratches and/or change of gloss level generated on the surface

Poor: severe scratches and/or change of gloss level generated on the surface

<Scratch Resistance Test: Pencil Hardness Test>

The decorative sheets obtained were each bonded to a wood substrate B using a urethane-based adhesive, and then subjected to a pencil hardness test as a scratch resistance evaluation. The decorative sheet was subjected to a testing method in conformity with JIS-K 5600, in which a pencil of 4B, 3B, 2B, B, HB, F, H, 2H, or 3H was fixed at an angle of the pencil with respect to the decorative sheet of 45±1°, and slid with a load of 750 g applied to the pencil, and the decorative sheet was checked by visual inspection regarding whether any scratches were formed on the decorative sheet. As an evaluation result, Table 1 shows the highest hardness of the pencil with which the surface of the decorative sheet was not scratched.

When the highest hardness was "H", "2H", or "3H", the decorative sheet was evaluated as approved.

Tables 1 and 2 show the evaluation results.

TABLE 1

| | Example 1 | Example 2 | Example 3 | Example 4 | Example 5 | Example 6 | Example 7 | Example 8 | Example 9 |
|---|---|---|---|---|---|---|---|---|---|
| Surface shape | Ridge | Ridge | Ridge | Ridge | Ridge | Ridge | Ridge | Ridge | Ridge |
| RSm/Ra | 150 | 130 | 100 | 250 | 150 | 180 | 300 | 200 | 80 |
| Thickness (µm) | 5 | 5 | 5 | 5 | 5 | 5 | 1 | 2 | 20 |

TABLE 1-continued

| | | | | | | | | | | |
|---|---|---|---|---|---|---|---|---|---|---|
| Acrylic resin | Number of functional groups | 6 | 5 | 6 | 6 | 6 | 6 | 6 | 6 | 6 |
| | Repeating structure — Structure | $C_2H_5O$ | $C_2H_5O$ | $C_2H_5O$ | $C_2H_5O$ | $C_3H_6O$ | $C_6H_{10}O_2$ | $C_2H_5O$ | $C_2H_5O$ | $C_2H_5O$ |
| | Number of repetitions | 30 | 30 | 50 | 12 | 30 | 30 | 30 | 30 | 30 |
| Additive | Particle size (μm) | 5 | 5 | 5 | 5 | 5 | 5 | 5 | 5 | 5 |
| | Addition amount (part) | 0.5 | 0.5 | 0.5 | 0.5 | 0.5 | 0.5 | 0.5 | 0.5 | 0.5 |
| Surface state | | Good | Good | Good | Good | Good | Good | Fair | Good | Good |
| 60° gloss value | | 5 | 5 | 3 | 8 | 5 | 10 | 10 | 5 | 4 |
| Fingerprint resistance | | Good | Good | Good | Good | Good | Good | Good | Good | Good |
| Stain resistance | Stain A | Good | Good | Good | Good | Good | Good | Good | Good | Good |
| Scratch resistance | Stainless steel | Good | Good | Good | Good | Good | Good | Fair | Good | Good |
| | Pencil hardness | H | H | 3H | H | 2H | 2H | H | H | H |

| | | Example 10 | Example 11 | Example 12 | Example 13 | Example 14 | Example 15 | Example 16 | Example 17 | Example 18 |
|---|---|---|---|---|---|---|---|---|---|---|
| Surface shape | | Ridge | Ridge | Ridge | Ridge | Ridge | Ridge | Ridge | Ridge | Ridge |
| RSm/Ra | | 50 | 100 | 250 | 150 | 150 | 140 | 140 | 300 | 10 |
| Thickness (μm) | | 25 | 25 | 5 | 5 | 5 | 5 | 5 | 1 | 25 |
| Acrylic resin | Number of functional groups | 6 | 6 | 6 | 6 | 6 | 6 | 6 | 6 | 6 |
| | Repeating structure — Structure | $C_2H_5O$ | $C_2H_5O$ | $C_2H_5O$ | $C_2H_5O$ | $C_2H_5O$ | $C_2H_5O$ | $C_2H_5O$ | $C_2H_5O$ | $C_2H_5O$ |
| | Number of repetitions | 30 | 30 | 30 | 30 | 30 | 30 | 30 | 30 | 50 |
| Additive | Particle size (μm) | 5 | None | None | 8 | 11 | 5 | 5 | None | 5 |
| | Addition amount (part) | 0.5 | — | — | 0.5 | 0.5 | 10 | 11 | — | 0.5 |
| Surface state | | Good | Fair | Fair | Good | Good | Good | Good | Fair | Good |
| 60° gloss value | | 3.5 | 8 | 10 | 5 | 5 | 4 | 4 | 15 | 1 |
| Fingerprint resistance | | Good | Good | Good | Good | Fair | Good | Fair | Good | Good |
| Stain resistance | Stain A | Good | Good | Good | Good | Fair | Good | Fair | Good | Good |
| Scratch resistance | Stainless steel | Good | Good | Good | Good | Fair | Good | Fair | Fair | Good |
| | Pencil hardness | H | 2H | 2H | H | H | H | H | H | H |

TABLE 2

| | | Comparative Example 1 | Comparative Example 2 | Comparative Example 3 |
|---|---|---|---|---|
| Surface shape | | Unevenness of particles | Ridge | Ridge |
| RSm/Ra | | 400 | 100 | 4000 |
| Thickness (μm) | | 5 | 5 | 5 |
| Acrylic resin | Number of functional groups | 6 | 4 | 6 |
| | Repeating structure — Structure | $C_2H_5O$ | $C_2H_5O$ | None |
| | Number of repetitions | 30 | 35 | 0 |
| Additive | Particle size (μm) | 5 | 5 | 5 |
| | Addition amount (part) | 15 | 0.5 | 0.5 |
| Surface state | | Good | Good | Good |
| 60° gloss value | | 15 | 3 | 90 |
| Fingerprint resistance | | Poor | Good | Poor |
| Stain resistance | Stain A | Poor | Good | Good |
| Scratch resistance | Stainless steel | Poor | Poor | Good |
| | Pencil hardness | HB | 2B | 3H |

As shown in Table 1, the decorative sheets of Examples 1 to 18 can provide decorative sheets achieving all of fingerprint resistance, scratch resistance, and stain resistance while having low gloss level. By optimizing not only the surface shape of the surface protection layer and the resin composition of the surface protection layer, but also the layer thickness of the surface protection layer and the particle size and the addition amount of the particles blended, the performance can be further improved.

REFERENCE SIGNS LIST

1 . . . Decorative sheet; 2 . . . Primary film layer; 3 . . . Pattern layer; 4 . . . Transparent resin layer; 5 . . . Surface protection layer; 6 . . . Primer layer; 7 . . . Adhesive layer; 8 . . . Concealing layer; 11 . . . Decorative material; B . . . Substrate.

What is claimed is:

1. A decorative sheet, comprising:

a primary film layer and a surface protection layer disposed on one surface of the primary film layer, wherein the surface protection layer includes on a surface thereof a ridged portion protruding in a shape of a ridge and thus has an uneven shape formed on the surface, the uneven shape of the surface protection layer has a ratio RSm/Ra in a range of 10 or more and 300 or less, the surface protection layer contains an ionizing radiation-curable resin as a main material, the ionizing radiation-curable resin contains as a main component an acrylic resin having a repeating structure, the acrylic resin has a dipentaerythritol structure, the repeating structure has one of ethylene oxide, propylene oxide, and ¿-caprolactone structures, a number of repetitions of the repeating structure is 12 or more, the surface protection layer has a thickness of 2 μm or more and 25 μm or less, and a number of acryloyl groups contained in the dipentaerythritol structure is 5 or 6.

2. The decorative sheet of claim 1, wherein the surface protection layer includes particles having an average particle size of 10 μm or less.

3. The decorative sheet of claim 2, wherein an addition amount of the particles is in a range of 0.5 parts by mass or more and 10 parts by mass or less, relative to 100 parts by mass of the ionizing radiation-curable resin.

4. The decorative sheet of claim 1, wherein the surface protection layer has a gloss level of 5.0 or less.

5. The decorative sheet of claim 1, wherein the surface protection layer includes a core portion and the ridged portion formed on the core portion, and a ratio between a layer thickness of the ridged portion and a layer thickness of the core portion (layer thickness of ridged portion/layer thickness of core portion) is in a range of 0.01 or more and 2.0 or less.

6. The decorative sheet of claim 1, wherein the surface protection layer includes a core portion and the ridged portion formed on the core portion, and a ratio between a layer thickness of the ridged portion and a layer thickness of the core portion (layer thickness of ridged portion/layer thickness of core portion) is in a range of 0.1 or more and 1.0 or less.

7. The decorative sheet of claim 1, wherein the uneven shape of the surface protection layer has a ratio RSm/Ra in a range of 80 or more and 150 or less.

8. The decorative sheet of claim 1, wherein a cross-sectional shape of the ridged portion in a thickness direction of the surface protection layer is a sine wave shape.

9. A decorative sheet, comprising:

a primary film layer and a surface protection layer disposed on one surface of the primary film layer, wherein the surface protection layer includes on a surface thereof a ridged portion protruding in a shape of a ridge and thus has an uneven shape formed on the surface, the uneven shape of the surface protection layer has a ratio RSm/Ra in a range of 10 or more and 300 or less, the surface protection layer contains an ionizing radiation-curable resin as a main material, the ionizing radiation-curable resin contains as a main component an acrylic resin having a repeating structure, the acrylic resin has a dipentaerythritol structure, the repeating structure has one of ethylene oxide, propylene oxide, and ε-caprolactone structures, a number of repetitions of the repeating structure is 12 or more, the surface protection layer has a thickness of 2 μm or more and 25 μm or less, the surface protection layer includes particles having an average particle size of 10 μm or less, an addition amount of the particles is in a range of 0.5 parts by mass or more and 10 parts by mass or less, relative to 100 parts by mass of the ionizing radiation-curable resin; and the ionizing radiation-curable resin is selected from the group consisting of ethoxylated dipentaerythritol pentaacrylate, ethoxylated dipentaerythritol hexaacrylate, propoxylated dipentaerythritol hexaacrylate and caprolactone-modified dipentaerythritol hexaacrylate.

10. The decorative sheet of claim 9, wherein the ionizing radiation-curable resin is selected from the group consisting of ethoxylated dipentaerythritol hexaacrylate, propoxylated dipentaerythritol hexaacrylate and caprolactone-modified dipentaerythritol hexaacrylate.

* * * * *